(12) United States Patent
Saito et al.

(10) Patent No.: US 6,809,422 B2
(45) Date of Patent: Oct. 26, 2004

(54) ONE-CHIP IMAGE PROCESSING APPARATUS

(75) Inventors: Takahiro Saito, Yokohama (JP); Kenichi Mori, Fujisawa (JP); Atsushi Kunimatsu, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/622,700

(22) Filed: Jul. 21, 2003

(65) Prior Publication Data
US 2004/0178507 A1 Sep. 16, 2004

(30) Foreign Application Priority Data
Mar. 12, 2003 (JP) ........................................ 2003-066763

(51) Int. Cl.[7] .......................... H01L 23/48; H01L 23/52; H01L 29/40; G06F 15/80
(52) U.S. Cl. ....................... 257/778; 257/777; 345/505; 345/601
(58) Field of Search ................................. 257/777, 778; 345/601, 505–509

(56) References Cited
U.S. PATENT DOCUMENTS 6,198,488 B1    3/2001   Lindholm et al.
6,333,744 B1   12/2001   Kirk et al.
6,388,671 B1 *  5/2002   Yoshizawa et al. ......... 345/505
6,642,930 B1 * 11/2003   Matsuura et al. ........... 345/601

* cited by examiner

Primary Examiner—Cuong Nguyen
(74) Attorney, Agent, or Firm—Oblon, Spivak, McClelland, Maier & Neustadt, P.C.

(57) ABSTRACT

A block expanding section and a plurality of pixel processing sections are formed in the same semiconductor chip. The block expanding section handles an area to be drawn in units of blocks each composed of an appropriate number of pixels and performs expansion calculation of information of a representative value of each block. Each of the plurality of pixel processing sections has a pixel expanding section and a computing section. The pixel expanding section expands information in units of pixels at least in a rectangular area from block representative point information calculated in the block expanding section. The computing section performs computation in units of pixels information-expanded by the pixel expanding section. Each of the plurality of pixel processing sections selectively performs either graphics processing performed in cooperation with the block expanding section, or image processing performed independent of the block expanding section.

12 Claims, 9 Drawing Sheets

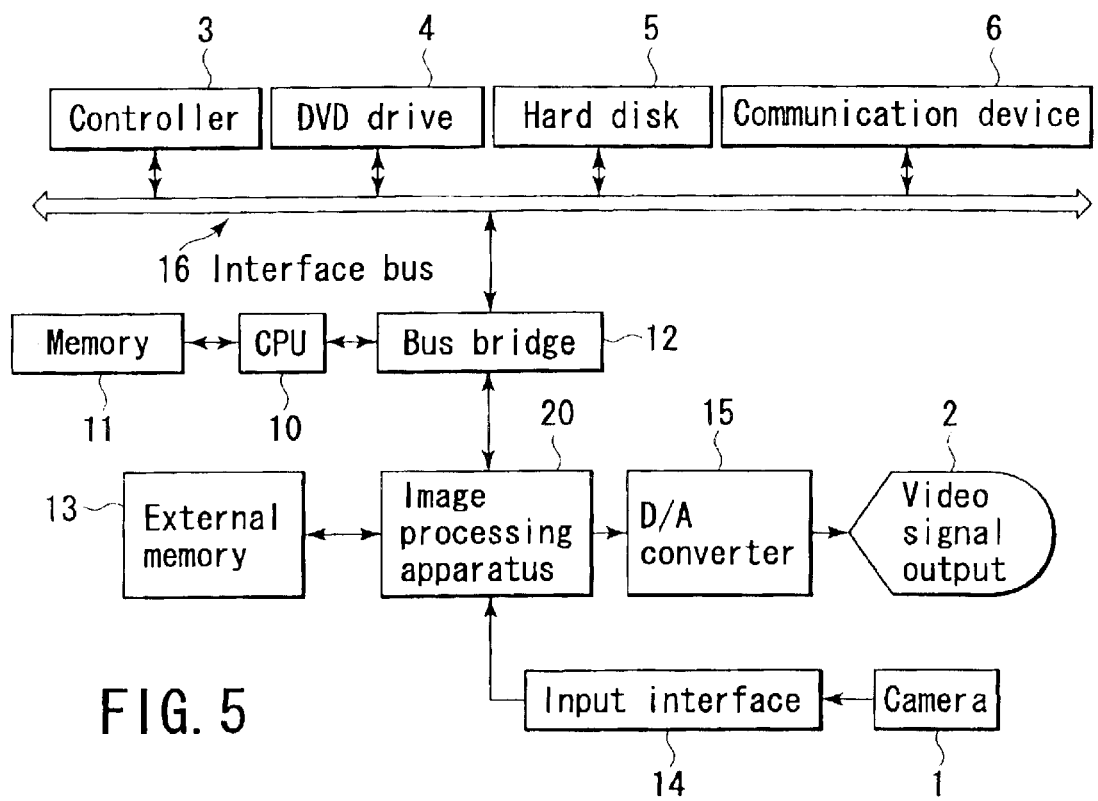
FIG. 5
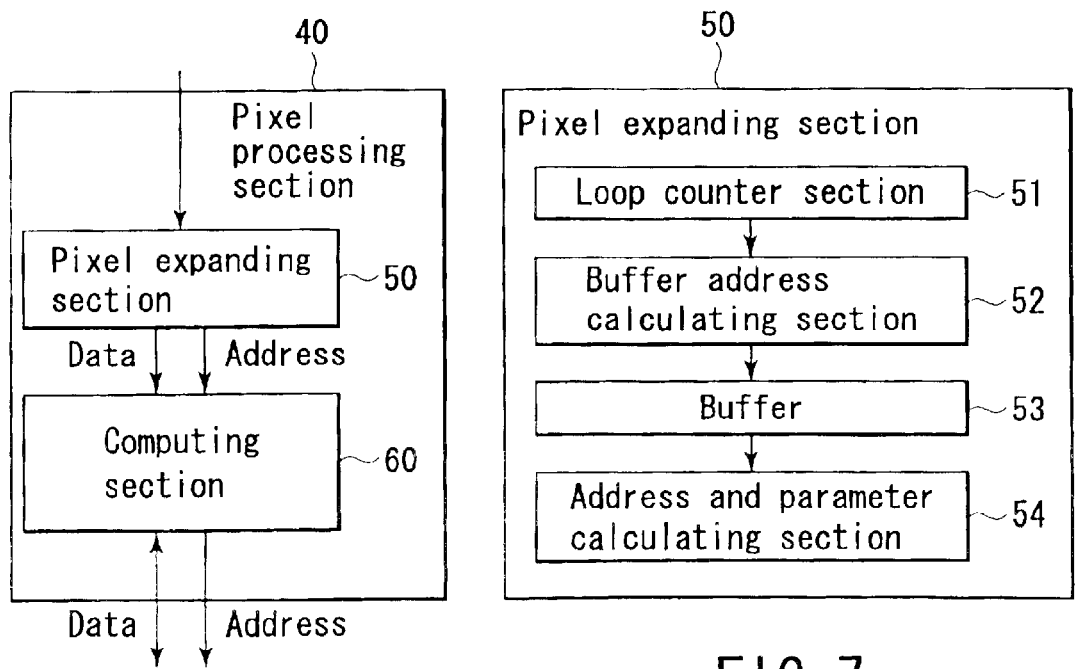
FIG. 6
FIG. 7

| Processing section 00 | Processing section 01 | Processing section 02 | Processing section 03 |
|---|---|---|---|
| Processing section 00 | Processing section 01 | Processing section 02 | Processing section 03 |

FIG. 12

| Processing section 00 | Processing section 01 | |
|---|---|---|
| Processing section 02 | Processing section 03 | stamp 1 |
| Processing section 04 | Processing section 05 | |
| Processing section 06 | Processing section 07 | |
| stamp 2 | | stamp 3 | stamp 0

FIG. 13

Relative address data
(0,0), (1,0), (0,1), (0,2), (1,1), ......, (6,7), (7,7)

ONE-CHIP IMAGE PROCESSING APPARATUS

CROSS-REFERENCE TO RELATED APPLICATIONS

This application is based upon and claims the benefit of priority from the prior Japanese Patent Application No. 2003-066763, filed Mar. 12, 2003, the entire contents of which are incorporated herein by reference.

BACKGROUND OF THE INVENTION

1. Field of the Invention

The present invention relates to an image processing apparatus, particularly to a one-chip image processor. Further, the present invention relates to an image processing apparatus for use in, for example, computer graphics, computer vision, image filters, and the like.

2. Description of the Related Art

Generally, an image processing apparatus has an image processing section configured with a rasterizing section for preparing an address and a computing parameter, and a computing section for performing processing in units of pixels.

Conventionally, a processor used for computer graphics requires a highly functional rasterizing section for expanding an arbitrary triangle into pixels. Further, when high-level shading processing is performed for pixels, a complex computing section having a pipeline structure or a pixel pipeline is required. An image pipeline system is described in, for example, U.S. Pat. No. 6,198,488 of Lindholm et al. In such an image pipeline system, many circuits which do not require to operate when simple image processing is performed are included and latency until a processing result is output also becomes longer, which deteriorates processing efficiency.

On the other hand, a conventional image processor for use in computer graphics, image filters, or the like is configured with address-generating and computing sections having remarkably simple configurations. Therefore, when complex graphics processing is performed, data is frequently written into/read from a memory, which deteriorates processing efficiency.

Further, because a general versatile processor cannot utilize the parallelism of pixel processing unique to general image processing, processing efficiency is worse as compared with an image-processing-exclusive processor.

FIG. 1 shows one configuration example of a conventional image processing section. This image processing section uses a Digital Differential Analyzer (DDA) as a processing algorithm.

In the image processing section, a setup section 201, a DDA section 202, an expansion section 203, a plurality of pixel processing sections 204, a memory controller 205, and an internal memory 206 are formed on the same semiconductor chip.

The setup section 201, the DDA section 202, and the expand section 203 perform rasterizing processing. The pixel processing sections 204 are directed for performing pixel processing, and each pixel processing section 204 includes a computing section 207.

FIG. 2 shows one operation example of the pixel processing section 204 in FIG. 1.

This example shows a case where eight pixel processing sections 204 are provided, and a stamp of 4×2 pixels is simultaneously processed by a pipe line of 4×2.

In the pixel processing section 204 in FIG. 1, when the computing section 207 performs loop computation processing a plurality of times, a plurality of neighboring pixels are processed by a different loop configured in the path from the setup section 201 to the computing section 207, which makes control by the memory controller 205 complex.

U.S. Pat. No. 6,333,744 of Kirk et al discloses a graphics processing apparatus for performing processing with respect to pixels. The apparatus disclosed performs pixel processing at a texture stage and at a register combiner stage. Required data is read from a memory into the texture stage, where processing appropriate for graphics is performed. A color of a pixel is calculated using the data at the register combiner stage. At the register combiner stage, input data and a computation type are defined to the respective cascade-connected computing devices and data streams are flowed so that the pixels are processed. Therefore, the numbers of computing devices and items of input data are increased so that an input data designation method or a connection relationship between the computing devices is made more flexible.

As described above, with respect to the conventional image processing apparatus, there has not been proposed architecture of an image processor capable of efficiently performing image processing in computer graphics, computer vision, or image filtering, and the problem is desired to be eliminated.

BRIEF SUMMARY OF THE INVENTION

According to an aspect of the present invention, there is provided an image processing apparatus comprises a block expansion section formed in a semiconductor chip, which handles an area to be drawn in units of blocks each composed of a plurality of pixels and performs expansion calculation of information on a representative point of each block; and a plurality of pixel processing sections formed in the semiconductor chip, each of the plurality of pixel processing sections comprises: a pixel expanding section which receives block representative point information calculated in the block expanding section and expands information in units of pixels at least in a rectangular area from the information; and a computing section which receives information expanded by the pixel expanding section and performs computation in units of pixels from the information each of the plurality of pixel processing sections 9, performs graphics processing in cooperation with the block expanding section, and performs image processing independent of the block expanding section.

BRIEF DESCRIPTION OF THE SEVERAL VIEWS OF THE DRAWING

FIG. 5 is a block diagram showing one example of an image processing system using the image processing apparatus in FIG. 4;

FIG. 6 is a block diagram showing a configuration example of a pixel processing section in FIG. 5;

FIG. 7 is a block diagram showing a configuration diagram of a pixel expanding section in FIG. 6;

FIG. 12 is a diagram showing one example of assignment of interblock processing with respect to the pixel processing section shown in FIG. 11;

FIG. 13 is a diagram showing another example of the assignment of interblock processing with respect to the pixel processing section shown in FIG. 11;

DETAILED DESCRIPTION OF THE INVENTION

Hereinafter, the present invention will be described in more detail, by way of embodiments, with reference to the drawings.

<First Embodiment>

Figure 3:
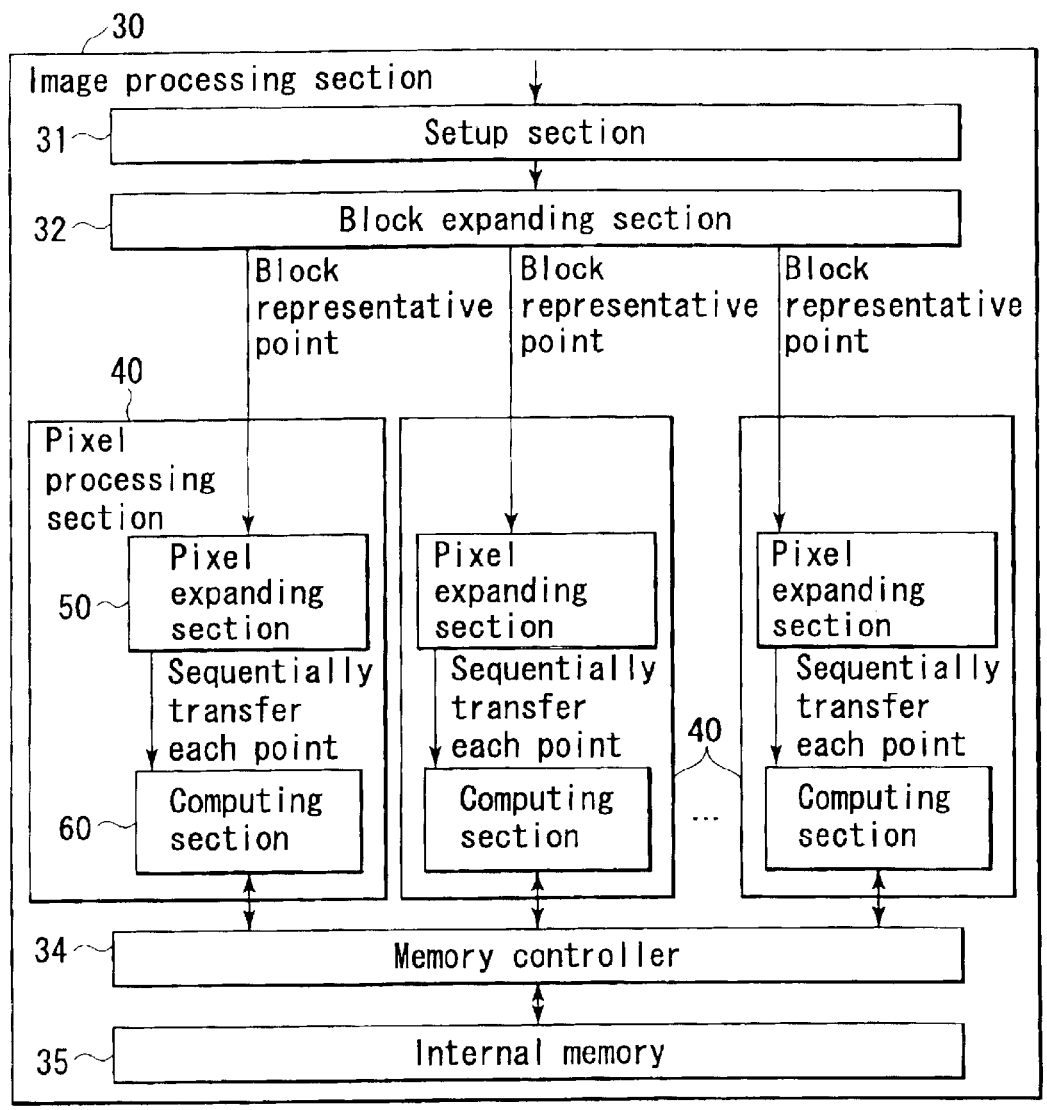
FIG. 3 is a block diagram showing a configuration example of an image processing section used in a first embodiment of an image processing apparatus according to the present invention.

FIG. 3 shows a configuration example of an image processing section used in a first embodiment of the image processing apparatus according to the present invention.

An image processing section 30 shown in FIG. 3 includes a setup section 31, a block expanding section 32, a plurality of pixel processing sections 40, a memory controller 34, and an internal memory 35, which are formed on the same semiconductor chip. An external memory may be employed in place of the internal memory 35. The setup section 31 has a function of computing an initial value or an inclination coefficient for performing rasterization with respect to transmitted apex information.

The block expanding section 32 has a function of handling an area to be drawn in units of blocks each composed of an appropriate number of pixels and calculating information development (rasterizing) with respect to a representative point of each block. In this case, a processing algorithm is DDA, and the block development is a higher level rasterizing.

Figure 4:
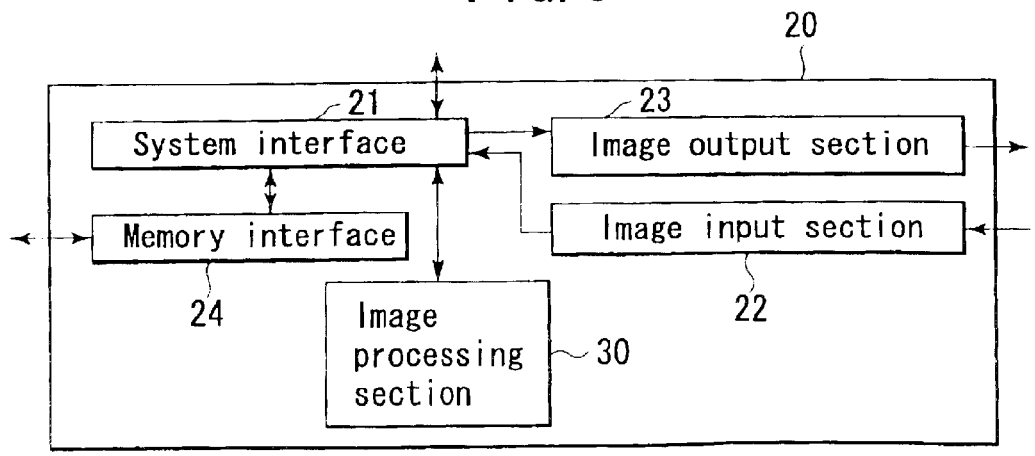
FIG. 4 is a block diagram showing a configuration example of an image processing apparatus having the image processing section in FIG. 3.

FIG. 4 shows a configuration example of an image processing apparatus 20 having the image processing section 30 in FIG. 3.

In FIG. 4, an image input section 22, an image output section 23, a memory interface 24, and the image processing section 30 are connected to a system interface 21.

FIG. 5 shows one example of an image processing system using the image processing apparatus 20 in FIG. 4.

A CPU 10 transmits/receives data to/from a memory 11. The CPU 10 is connected to the image processing apparatus 20 via a bus bridge 12. The image processing apparatus 20 transmits/receives data to/from an external memory 13, and is connected to a camera 1 via an input interface 14. Further, the image processing apparatus 20 is connected to a video signal output section 2 via a D/A converter 15. A controller 3, a DVD drive device 4, a hard disk device 5, and a communication device 6 are connected to the bus bridge 12 via an interface bus 16.

FIG. 6 shows a configuration example of the pixel processing section 40 in FIG. 3.

The pixel processing section 4.0 includes a pixel expanding section 50 and a computing section 60.

The pixel expanding section 50 has a function of calculating development of data and addresses in units of pixels at least in a rectangular area from block representative point information calculated in the block expanding section 32 in FIG. 3.

The computing section 60 has a function of performing computation in units of pixels information—expanded by the pixel expanding section 50 and outputting data and addresses. At the time of computation, data is transmitted to/received from the internal memory 35 via the memory controller 34 in FIG. 3.

FIG. 7 shows a configuration example of the pixel expanding section 50 in FIG. 6.

In the pixel expanding section 50, a loop counter section 51 controls counting of a multiple loop, and a buffer address calculating section 52 calculates a buffer address for reading data from a buffer 53 in the pixel processing section 40. An address and parameter calculating section 54 reads data from the buffer 53, and calculates a plurality of parameters and memory addresses required in the computing section 60 in FIG. 6.

Figure 8:
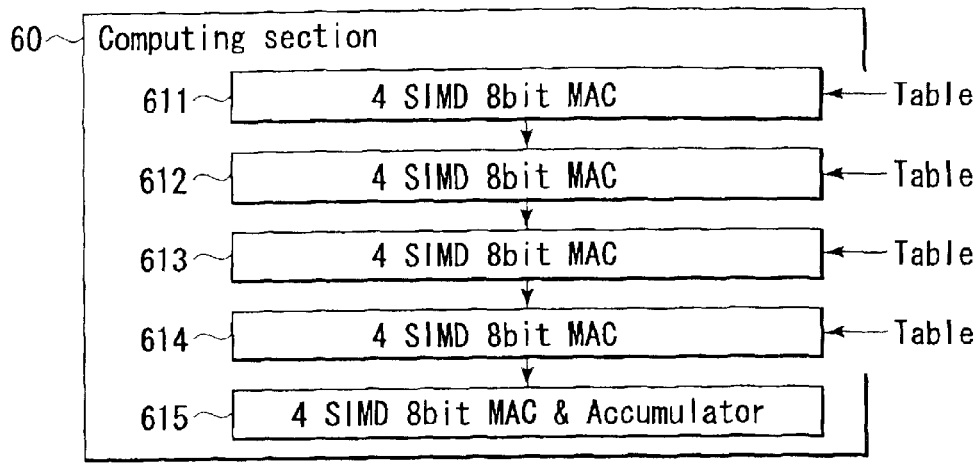
FIG. 8 is a block diagram showing a configuration example of a computing section in FIG. 6.

FIG. 8 shows a configuration example of the computing section 60 in FIG. 6. The computing section 60 includes a plurality of MAC (product sum calculating) sections 611 to 614 and a final stage section 615 of the MAC sections.

The computing section 60 uses a plurality of addresses calculated in the pixel expanding section 50 shown in FIG. 7, that is four items of single instruction multiple data (SIMD) in this example, to read data from the internal memory 35 via the memory controller 34 in FIG. 3. A plurality of parameters calculated in the pixel expanding section 50 are given to each MAC section 611 to 614, and a required computation is performed. The final stage section 615 of the MAC sections does not read data from the internal memory 35. In other words, the final stage 615 has an accumulator register instead of using read data so as to perform accumulation.

Next, an operation of the image processing section 30 shown in FIG. 3 will be described. The image processing section 30 shown in FIG. 3 selectively performs either graphics processing performed by the block expanding section 32 and the pixel processing section 40 in a cooperation manner or image processing performed by the pixel processing section 40 independent of the block expanding section 32.

At first, in the case where the graphics processing is performed, the setup section 31 calculates an initial value or an inclination coefficient for performing rasterization with respect to transmitted apex information. The block expanding section 32 calculates a representative value for each block of the pixel amount which can be processed by each pixel processing section 40 on the basis of the information transmitted from the setup section 31. Each pixel processing section 40 performs calculation with respect to pixels in a block on the basis of the representative value transmitted form the block expanding section 32.

Figure 9:
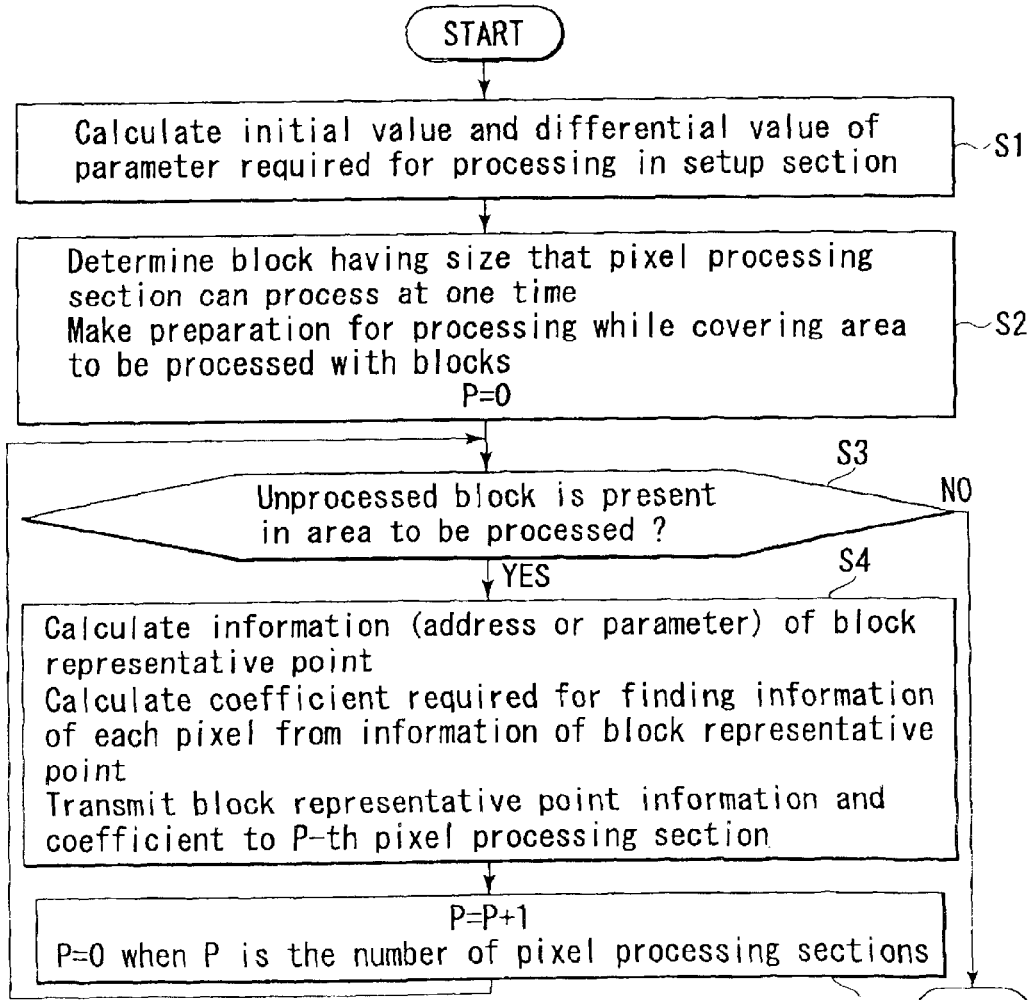
FIG. 9 is a diagram showing a flow chart of the image processing section shown in FIG. 3.

FIG. 9 shows flow chart when calculation of the block representative value is processed by one pass in the image processing section 30 shown in FIG. 3.

At first, in step S1, an initial value and a difference of a parameter required for the processing are calculated in the setup section 31. Next, in step S2, a block having the size which the pixel processing section 40 can process at one time is determined. In addition, preparation for the processing is performed while covering an area to be processed with blocks. At this time, the number P of the pixel processing section is set to 0.

Next, in step S3, a determination is made as to whether or not an unprocessed block is present in the area to be processed. When the determination result is YES, that is, when an unprocessed block is present, the processing proceeds to step S4, where an address or parameter of the block representative point is calculated. A coefficient required for finding information of each pixel is calculated from the block representative point information, and the block representative point information and the coefficient are transmitted to the P-th pixel processing section. In step S5, the number P of the pixel processing section is incremented by 1 (P=P+1). When P matches the number of the pixel processing sections, the number P of the pixel processing section is reset to 0, and the processing returns to step S3.

In step S3, when the determination result is NO, that is, when an unprocessed block is not present, the processing is terminated.

On the other hand, in the case where the image processing is performed in the image processing section 30 in FIG. 3, the representative value for each block can be previously calculated in many cases so that calculation for pixels is performed by only each pixel processing section 40 shown in FIG. 3.

Namely, the image processing section 30 in FIG. 3 having the above configuration configures the rasterizing section to which the processing in units of pixels is classified in a two-stage configuration, that is, by the block expanding section 32 and the pixel expanding section 50. Thereby, in the graphics processing, the block expanding section 32 and the pixel expanding section 50 cooperate so that a rendering processing is performed by cooperation processing thereof. Further, in a vision processing or image processing, the pixel processing section 40 operates independent of the block expanding section 32 and the respective pixel processing sections 40 perform block processing so that the image processing can be efficiently performed.

Figure 1:
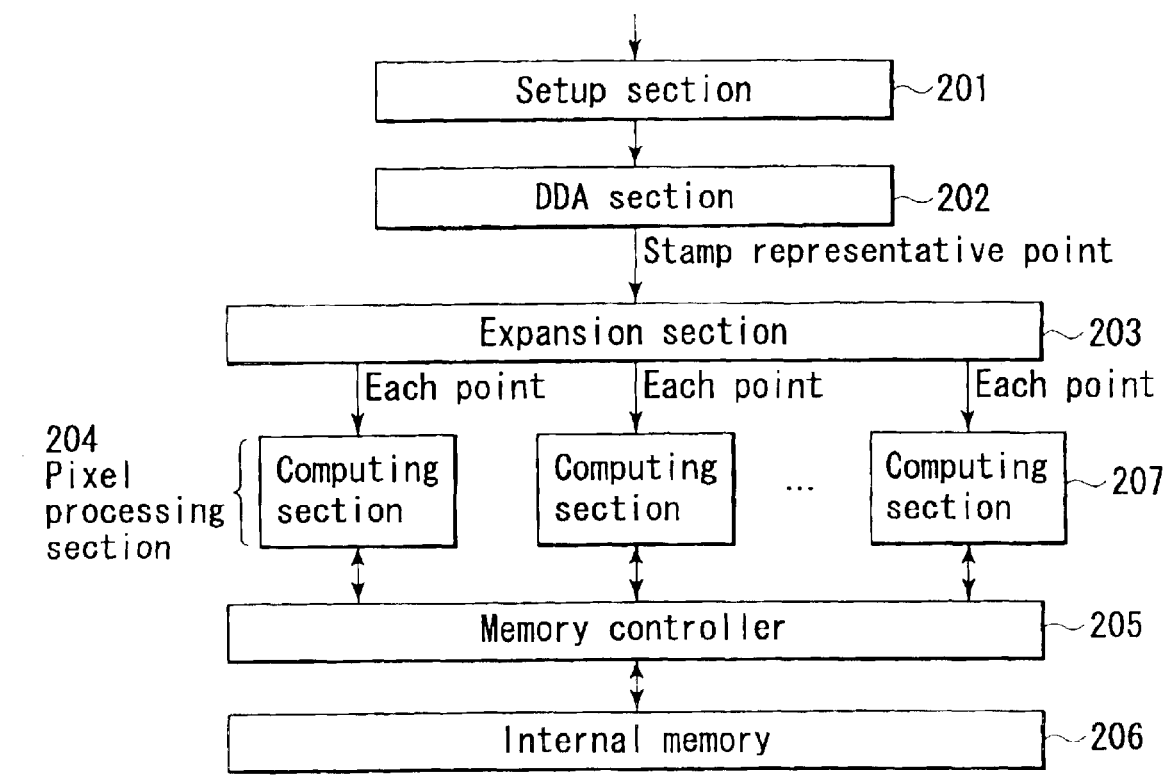
FIG. 1 is a block diagram showing a configuration example of an image processing section in a conventional image processing apparatus.
Figure 2:
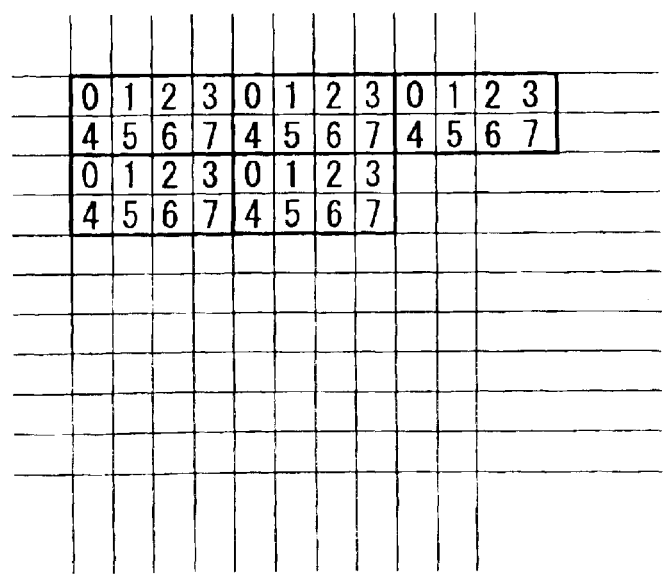
FIG. 2 is a diagram showing an operation example of a pixel processing section in FIG. 1.

On the contrary, a conventional pixel processing section 204 shown in FIG. 1 performs only pixel processing in the graphics processing.

<Second Embodiment>

Figure 10:
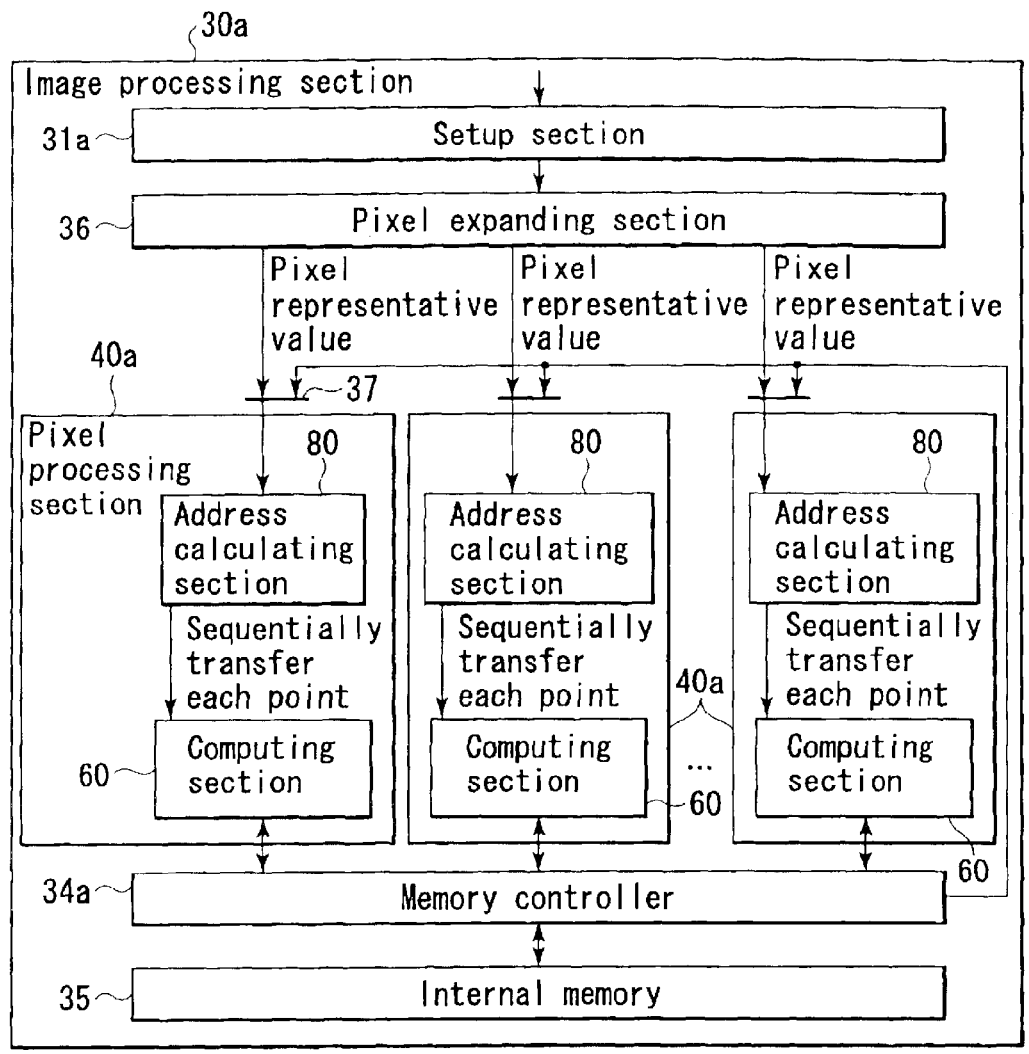
FIG. 10 is a block diagram showing a configuration example of an image processing section used in a second embodiment of the image processing apparatus according to the present invention.

FIG. 10 shows a configuration example of an image processing section 30a used in a second embodiment of the image processing apparatus according to the present invention.

This image processing section 30a is different from the image processing section 30 described above with reference to FIG. 3 in that a pixel expanding section 36 is provided instead of the block expanding section 32, an address calculating section 80 is provided in each pixel processing section 40a instead of the pixel expanding section 50 in FIG. 3, and selectors 37 controlled by a memory controller 34a are added, and is identical thereto in others, so that like numerals are denoted to portions corresponding to those in FIG. 3.

Namely, when the graphics processing is performed in the image processing section 30a in FIG. 10, a setup section 31a calculates a parameter for use in rasterizing in the pixel expanding section 36, and the pixel expanding section 36 calculates the coordinate of the center of gravity commonly used for each parameter calculation of pixels to generate a pixel representative value, and outputs one or more pixel representative values in a rectangular area. In this case, a plurality of selectors 37 are provided at input sides of the respective pixel processing sections 40a. The operations of the selectors 37 are controlled at output sides of the memory controller 34a and one pixel processing section 40a is selected so that the pixel representative value is transferred. This processing is sequentially performed with respect to a plurality of pixel processing sections 40a. In this case, a processing algorithm is Direct Evaluation (DE), and the block development is the pixel development.

Each pixel processing section 40a calculates an address or parameter sequentially required for each transferred pixel in the address calculating section 80, and transfers the calculation result to the computing section 60. In this case, the address calculating section 80 performs address calculation of at least the rectangular area in order to sequentially process a plurality of pixels in the rectangular area. The computing section 60 acquires required data from the transferred address via the memory controller 34a from the internal memory 35, and performs actual computation to output the processing result.

In other words, the above processing is repeatedly performed in the address calculating section 80 and the computing section 60 while changing pixels with respect to all the pixels transferred to the pixel processing section 40a. When a series of processings are terminated, the pixel data is written into the predetermined buffer in the internal memory 35. This processing is performed with respect to all the input primitives.

On the other hand, in the case where the image processing is performed in the image processing section 30a in FIG. 10, an individual parameter for each pixel is not particularly required unlike the coordinate of the center of gravity or the like. Thus, the address calculation in the rectangular area can be mostly performed by the accumulator of the computing section 60. Therefore, the representative value of the rectangular area is transferred from the internal memory 35 to each pixel processing section 40a, and an address or parameter of each pixel is calculated based on the representative value in the address calculating section 80, and the computing section 60 performs processing of filtering or template matching, which is actual image processing, using the result.

For example, in the filtering by a kernel of 8×8 pixels, the address calculating section 80 sequentially calculates a pixel address in a kernel of a target image, and gives it to the computing section 60 together with a filter coefficient. The computing section 60 reads the pixel data form the given address, and performs multiplication by the filter coefficient to accumulate the result. At this time, any number of pixels for which multiplication is simultaneously performed can be used, and the number of pixels is 4 in this example.

<Third Embodiment>

Figure 11:
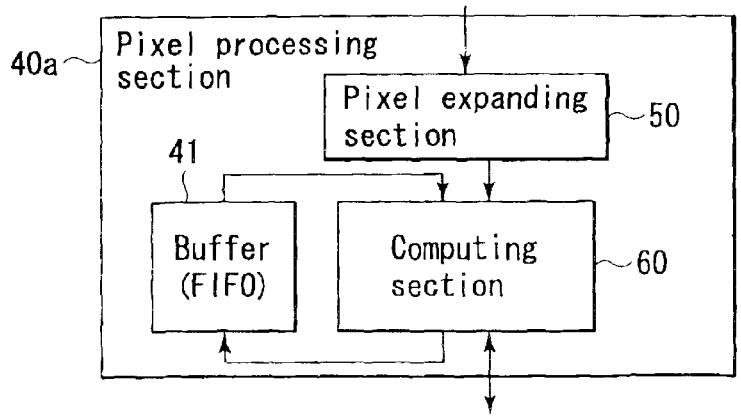
FIG. 11 is a block diagram showing a configuration example of a pixel processing section used in a third embodiment of the mage processing apparatus according to the present invention.

FIG. 11 shows a configuration example of a pixel processing section 40a used in a third embodiment of the image processing apparatus according to the present invention.

This pixel processing section 40a is different from the pixel processing section 40 shown in FIG. 6 in that there is added a loop for returning an output of the computing section 60 to an input of the computing section 60 via a First-in First-out (FIFO) type buffer circuit 41, and is otherwise identical thereto.

In this manner, when the loop caused by the buffer circuit 41 is provided, a value being calculated is not required to return to the memory 35, thus computing section 60 can perform processing by a plurality of times of looping, that is, can repeatedly perform the processing. Therefore, complex processing is decomposed into a plurality of procedures so that processing can be performed quickly, even by a computing section 60 having a simple configuration, thereby reducing the circuit area of the computing section 60.

FIG. 12 shows one example of assignment of interblock processing with respect to the pixel processing section 40a shown in FIG. 11.

This example shows a case where four pixel processing sections 40a are provided, and each pixel processing section 40a processes a stamp of 4×2 pixels.

Here, a smaller stamp of m1×m2 is processed by the pixel processing section 40a. The stamp has a size up to the number of pixels accumulated in the buffer circuit 41 of the pixel processing section 40a. The same coefficient is given from the block expanding section (DDA) to the pixel processing section 40a which belongs to the stamp. Each pixel processing section 40a interprets by adding an offset corresponding to the pixel processing section 40a itself. Therefore, the above processing can be said to be behavior directed to computer graphics (CG).

FIG. 13 shows another example of the assignment of interblock processing with respect to the pixel processing section 40a shown in FIG. 11.

This example shows a case where eight pixel processing sections 40a are provided and each pixel processing section 40a processes a stamp of 8×8 pixels by 4×2 pixels.

Here, because a larger stamp of n×n is processed by a plurality of pixel processing sections 40a, it is disadvantageous that the stamp is not filled. The pixel processing section 40a handles the pixels filled in the buffer circuit 41 of the pixel processing section 40a at one time. The same coefficient is given from the block expanding section (DDA) to the pixel processing section 40a which belongs to the stamp. Each pixel processing section 40a interprets by adding an offset corresponding to the pixel processing section 40a itself. Therefore, the above processing can be said to be behavior directed to image processing.

Figure 14:
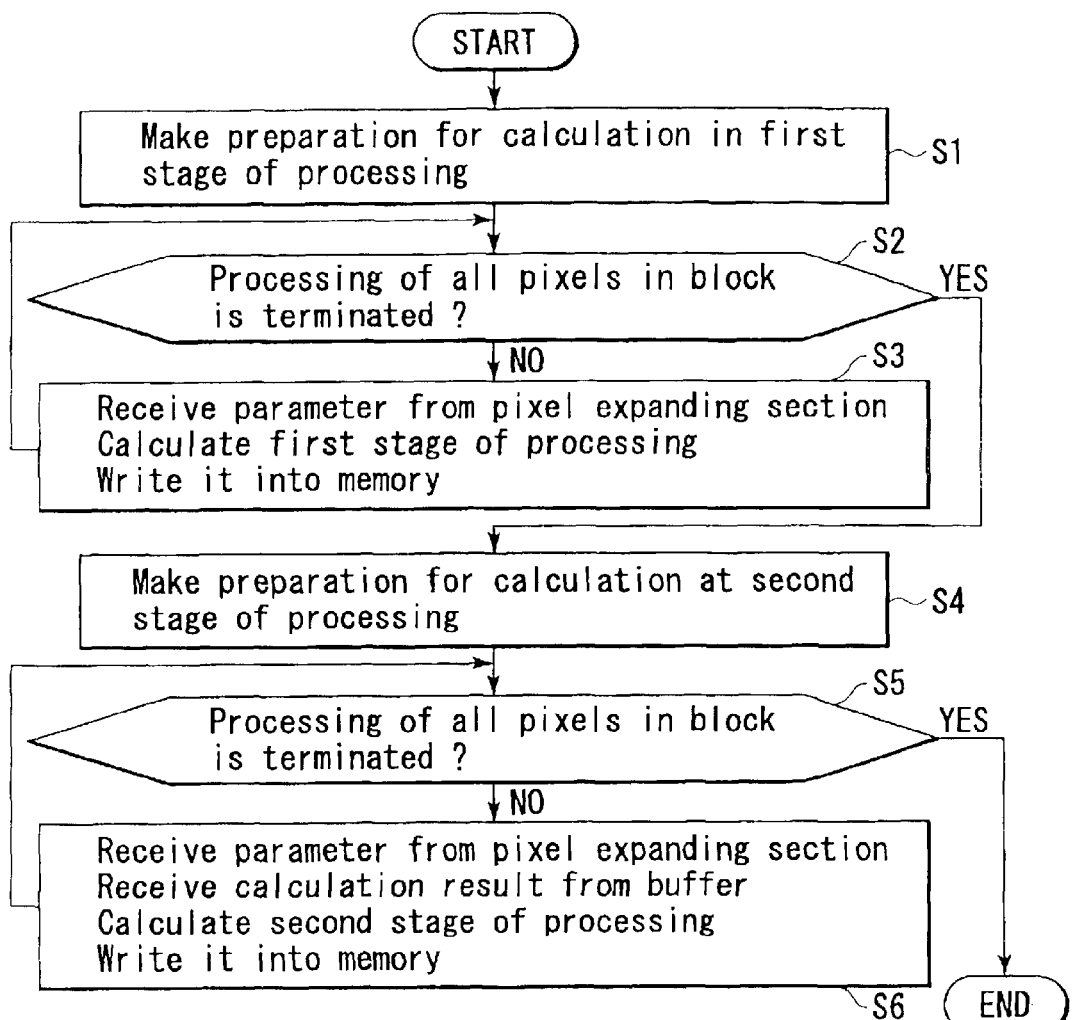
FIG. 14 is a diagram showing a flow chart of the image processing section in FIG. 3 having the pixel processing section shown in FIG. 11.

FIG. 14 shows flow chart when calculation of the block representative value is processed by two passes in the image processing section 30 in FIG. 3 in the case where the assignment of interblock processing for the pixel processing section 40a in FIG. 11 is performed as shown in FIGS. 12 and 13.

First, in step S1, preparation for calculation at the first stage of the processing is performed. Next, in step S2, a determination is made as to whether or not the processing of all the pixels in a block has been terminated. When the determination result is NO, that is, when an unprocessed pixel is present, the processing proceeds to step S3, where a parameter is received from the pixel expanding section and the calculation at the first stage of the processing is performed, and the result thereof is written into the buffer.

Thereafter, the processing returns to step S2. In step S2, when the determination result is YES, that is, when an unprocessed pixel is not present, the processing proceeds to step S4, where a preparation for calculation at the second stage of the processing is made. Next, in step S5, a determination is made as to whether or not the processing of all the pixels in a block has been terminated. When the determination result is NO, that is, when an unprocessed pixel is present, the processing proceeds to step S6, where a parameter is received from the pixel expanding section, the calculation result at the first stage of the processing is received form the buffer, and the calculation at the second stage of the processing is performed to be written into the memory. Thereafter, the processing returns to step S5. In step S5, when the determination result is YES, that is, when an unprocessed pixel is not present, the processing is terminated.

<Fourth Embodiment>

Figure 15:
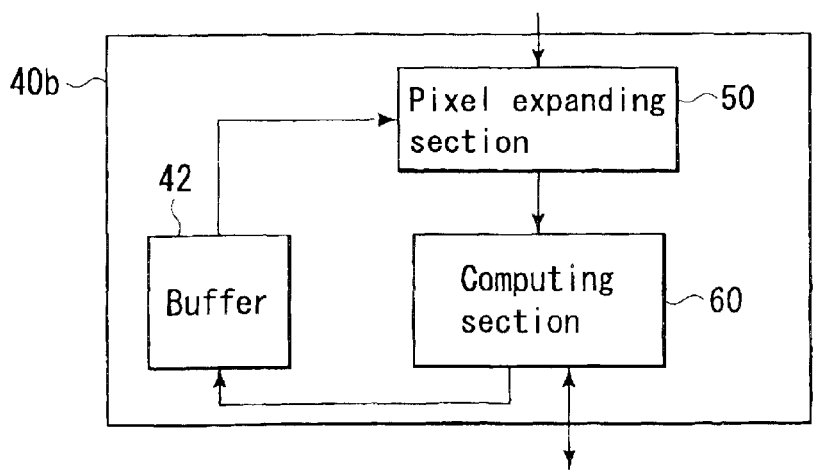
FIG. 15 is a block diagram showing a configuration example of a pixel processing section used in a fourth embodiment of the image processing apparatus according to the present invention.

FIG. 15 shows a configuration example of a pixel processing section 40b used in a fourth embodiment of the image processing apparatus according to the present invention.

This pixel processing section 40b is different from the pixel processing section 40a according to the third embodiment shown in FIG. 11 in that the calculation result of the computing section 60 is returned to the pixel expanding section 50 via the buffer circuit 42, and is identical thereto in others.

According to such a configuration, an address for the next processing can be calculated in the pixel expanding section 50 so that a so-called dependent texture processing can be efficiently performed.

The processing performed in the pixel processing section 40b having such a configuration includes Bumped Environment Mapping of graphics, and the like.

Figure 16:
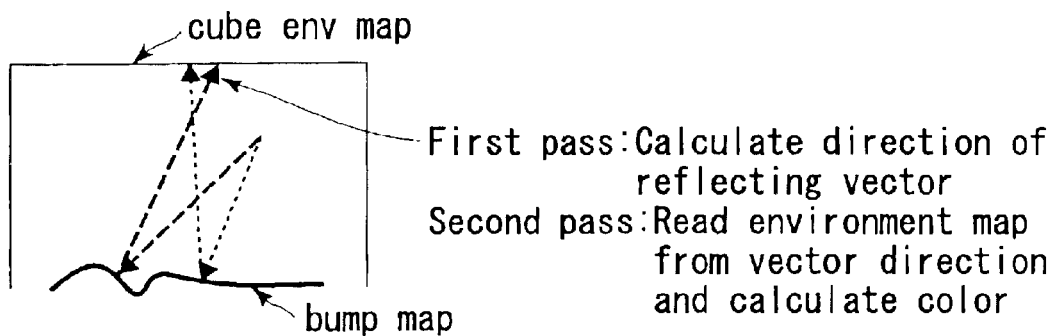
FIG. 16 is a diagram showing one example of a calculation operation of a bump environment map by the pixel processing section shown in FIG. 15.

FIG. 16 shows one example of a calculating operation of the Bumped Environment Mapping by the pixel processing section 40b.

First, a bump map is read, and calculation is performed as to an object or background in which direction is caught in the pixel. Next, an image of an environment map is read and a color of the pixel is calculated from the direction of the calculation result. At this time, a read address of the environment map is dependent on the read result of the bump map. The direction calculated from the bump map is stored in the buffer to perform the processing. For example, a direction of a vector reflected by the bump map is calculated at the first pass, and a color of the pixel is calculated by reading an image of the environment map from the direction of the vector at the second pass.

<Fifth Embodiment>

Figure 17:
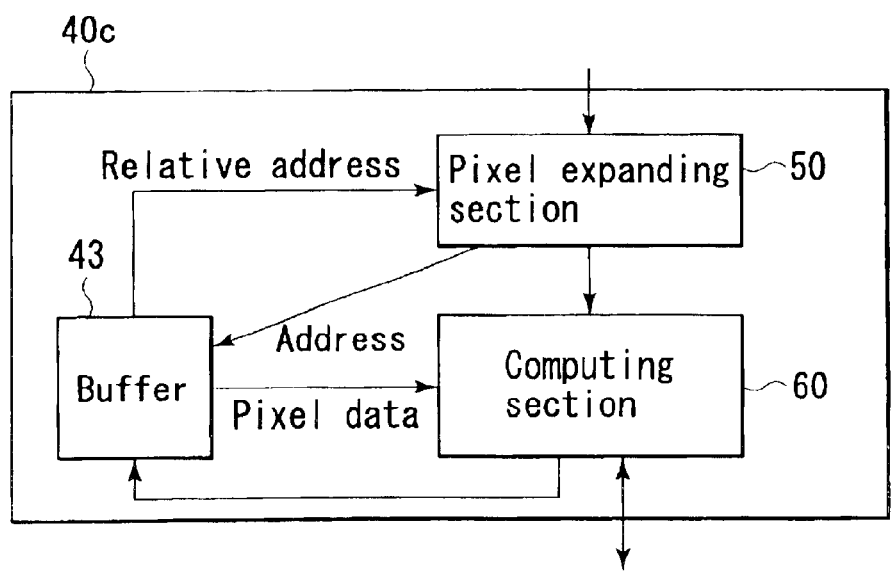
FIG. 17 is a block diagram showing a configuration example of a pixel processing section used in a fifth embodiment of the image processing apparatus according to the present invention.

FIG. 17 shows a configuration example of a pixel processing section 40c used in a fifth embodiment of the image processing apparatus according to the present invention.

This pixel processing section 40c is different from the pixel processing section 40b according to the fourth embodiment in that the calculation result of the computing section 60 is returned to the pixel expanding section 50 via the buffer circuit 43 and the data of the buffer circuit 43 based on the result of the address calculation in the pixel expanding section 50 is read by the computing section 60, and is identical thereto in others.

In other words, the buffer circuit 43 has a first pass where data is read into the pixel expanding section 50 and a second pass where data is read into the computing section 60 according to the address from the pixel expanding section 50.

According to such a configuration, the calculation result of the computing section 60 is used for the address calculation of the pixel expanding section 50 and the data of the buffer circuit 43 caused by the address is read by the computing section 60, thereby performing a more complicated processing.

The processing performed in the pixel processing section 40c having such a configuration includes zigzag scanning performed by encoding of color image standardized encoding method (MPEG). In MPEG encoding, zigzag scanning is performed after DCT conversion and standardizing.

Figure 18:
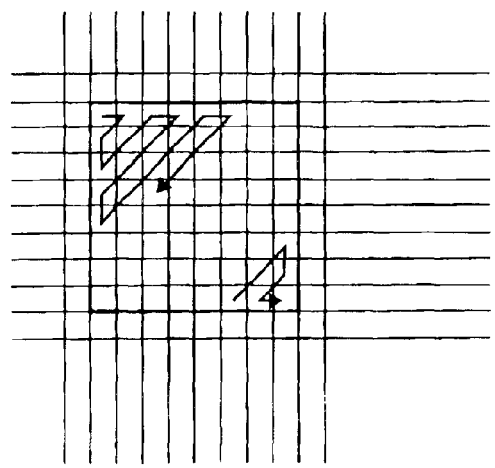
FIG. 18 is a diagram showing one example of relative addresses in zigzag scanning processing by the pixel processing section shown in FIG. 17.

FIG. 18 shows one example of relative addresses in the zigzag scanning processing by the pixel processing section 40c.

As shown in FIGS. 17 and 18, in the zigzag scanning, relative addresses for rearranging the order in the pixel expanding section 50 are read from the buffer circuit 43 and the addresses are calculated in the pixel expanding section 50 so that the calculation result so far is read.

<Sixth Embodiment>

Figure 19:
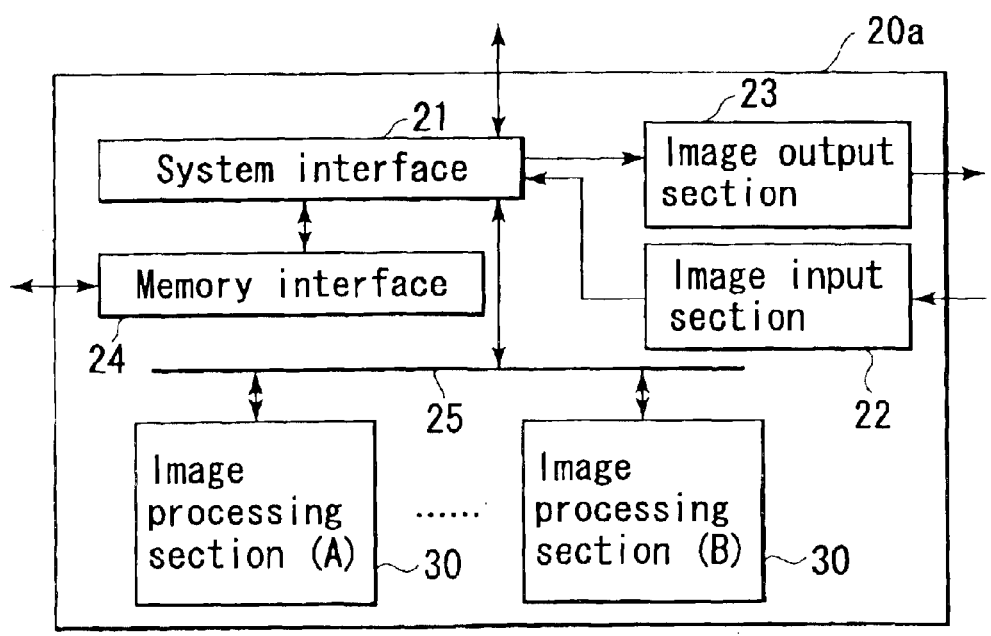
FIG. 19 is a block diagram showing an image processing apparatus according to a sixth embodiment of the present invention.

FIG. 19 shows a configuration example when a plurality of image processing sections are provided according to a sixth embodiment of the image processing apparatus of the present invention.

This image processing apparatus 20a is different from the image processing apparatus 20 described above with reference to FIG. 4 in that a plurality of image processing sections 30 are connected to the system interface 21 via a bus or cross bus 25 and is identical thereto in others, and therefore like numerals are denoted to portions corresponding to those in FIG. 4.

According to the image processing apparatus 20a having such a configuration, the plurality of image processing sections 30 can simultaneously perform processings different from each other. For example, it is possible that graphics rendering is performed in a first image processing section (A) 30 and MPEG encoding is simultaneously performed in a second image processing section (B) 30.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a block expanding section formed in a semiconductor chip, which handles an area to be drawn in units of blocks each composed of a plurality of pixels, and performs expansion calculation of information on a representative point of each block; and
a plurality of pixel processing sections formed in the semiconductor chip, each of said plurality of pixel processing sections comprises: a pixel expanding section which receives block representative point information calculated in the block expanding section and expands information in units of pixels at least in a rectangular area from the information; and a computing section which receives information expanded by the pixel expanding section and performs computation in units of pixels from the information, each of said plurality of pixel processing sections performs graphics processing in cooperation with the block expanding section, and performs image processing independent of the block expanding section.

2. The image processing apparatus according to claim 1, wherein the pixel expanding section comprises:
a loop counter section which controls counting of a multiple loop;
a buffer;
a buffer address calculating section connected to the loop counter section and the buffer, which calculates an address for reading data from the buffer; and
an address and parameter calculating section connected to the buffer, which reads data from the buffer and calculates a plurality of parameters and memory addresses required for the computing section.

3. The image processing apparatus according to claim 1, wherein the computing section comprises:
a plurality of product sum calculating sections which perform computation using data read from a memory inside or outside the image processing apparatus in accordance with a plurality of addresses calculated by the pixel expanding sections and a plurality of parameters calculated by the pixel expanding section; and
an accumulator added at the final stage of the product sum calculating sections, which performs accumulation instead of data reading from the memory.

4. The image processing apparatus according to claim 3, wherein each of said plurality of pixel processing sections further comprises a First-in First-out buffer circuit which is connected to the computing section and from/into which data is written into/read from the computing section.

5. The image processing apparatus according to claim 3, wherein each of said plurality of pixel processing sections further comprises a buffer circuit which is connected to the pixel expanding section and the computing section, into which data is written from the computing section, and from which data is read into the pixel expanding section.

6. The image processing apparatus according to claim 3, wherein each of said plurality of pixel processing sections further comprises a buffer circuit which is connected to the pixel expanding section and the computing section, and which has a first pass into which data is written from the computing section and from which data is read into the pixel expanding section and a second pass from which data is read into the computing section in accordance with an address from the pixel expanding section.

7. An image processing apparatus comprising:
a plurality of image processing sections, each of said plurality of image processing sections comprises:
a block expanding section formed in a semiconductor chip, which handles an area to be drawn in units of blocks each composed of a plurality of pixels, and performs expansion calculation of information on a representative point of each block; and
a plurality of pixel processing sections formed in the semiconductor chip, each of said plurality of pixel processing sections includes: a pixel expanding section which receives block representative point information calculated in the block expanding section and expands information in units of pixels at least in a rectangular area from the information; and
a computing section which receives information expanded by the pixel expanding section and performs computation in units of pixels from the information, each of said plurality of pixel processing sections performs graphics processing in cooperation with the block expanding section, and performs image processing independent of the block expanding section, and each of said plurality of image processing sections simultaneously performs processings different from each other.

8. An image processing apparatus comprising:
- a pixel expanding section formed in a semiconductor chip, which handles an area to be drawn in units of blocks each composed of a plurality of pixels and calculates a representative value of each pixel in each block; and
- a plurality of pixel processing sections formed in the semiconductor chip, each of said plurality of pixel processing sections comprises: an address calculating section which receives a pixel representative value calculated in the pixel expanding section and calculates a parameter and an address of a pixel at least in a rectangular area; and a computing section which receives an address calculated in the address calculating section and performs partial computation of pixel processing using data read from a memory according to the address, each of said plurality of pixel processing sections performs graphics processing in cooperation with the pixel expanding section, and performs image processing independent of the pixel expanding section.

9. The image processing apparatus according to claim 8, wherein each of said plurality of pixel processing sections further comprises a First-in First-out buffer circuit which is connected to the computing section and from/into which data is written into/read from the computing section.

10. The image processing apparatus according to claim 8, wherein each of said plurality of pixel processing sections further comprises a buffer circuit which is connected to the pixel expanding section and the computing section, into which data is written from the computing section, and from which data is read into the pixel expanding section.

11. The image processing apparatus according to claim 8, wherein each of said plurality of pixel processing sections further comprises a buffer circuit which is connected to the pixel expanding section and the computing section and which has a first pass into which data is written from the computing section and from which data is read into the pixel expanding section and a second pass from which data is read into the computing section according to an address from the pixel expanding section.

12. An image processing apparatus comprising:
- a plurality of image processing sections, each of said plurality of image processing sections comprises:
  - a pixel expanding section formed in a semiconductor chip, which handles an area to be drawn in units of blocks each composed of a plurality of pixels and calculates a representative value of each pixel in each block; and
  - a plurality of pixel processing sections formed in the semiconductor chip, each of said plurality of pixel processing sections includes: an address calculating section which receives a pixel representative value calculated in the pixel expanding section and calculates a parameter and an address of a pixel at least in a rectangular area; and a computing section which receives an address calculated in the address calculating section and performs partial computation of pixel processing using data read from a memory according to the address, each of said plurality of pixel processing sections performs graphics processing in cooperation with the pixel expanding section, and performs image processing independent of the pixel expanding section, and each of said plurality of image processing sections simultaneously performs processings different from each other.

* * * * *